(12) United States Patent
Baatz

(10) Patent No.: US 7,137,593 B2
(45) Date of Patent: Nov. 21, 2006

(54) VERTICAL CONVEYOR ARRANGEMENT FOR THE TRANSPORT OF CATERING SERVICE GOODS IN AN AIRCRAFT WITH AT LEAST TWO DECKS ARRANGED ONE ABOVE ANOTHER

(75) Inventor: Andreas Baatz, Sauensiek (DE)

(73) Assignee: Airbus Deutschland GmbH, Hamburg (DE)

( * ) Notice: Subject to any disclaimer, the term of this patent is extended or adjusted under 35 U.S.C. 154(b) by 143 days.

(21) Appl. No.: 10/514,975

(22) PCT Filed: Feb. 6, 2004

(86) PCT No.: PCT/DE2004/000213

§ 371 (c)(1),
(2), (4) Date: Nov. 17, 2004

(87) PCT Pub. No.: WO2004/069656

PCT Pub. Date: Aug. 19, 2004

(65) Prior Publication Data

US 2005/0211832 A1 Sep. 29, 2005

(30) Foreign Application Priority Data

Feb. 7, 2003 (DE) ................. 103 05 028

(51) Int. Cl.
*B64D 11/00* (2006.01)
(52) U.S. Cl. ................. 244/118.5; 198/468.8; 198/799
(58) Field of Classification Search ............ 244/118.5; 198/468.8, 801, 799
See application file for complete search history.

(56) References Cited

U.S. PATENT DOCUMENTS

| | | | |
|---|---|---|---|
| 2,478,019 A | | 8/1949 | Sonntag |
| 3,102,607 A | * | 9/1963 | Roberts ................. 186/40 |
| 3,257,142 A | | 6/1966 | Barry |
| 3,695,667 A | | 10/1972 | Dempsey |
| 4,221,515 A | | 9/1980 | Brown et al. |
| RE32,176 E | * | 6/1986 | Vernon .................. 244/118.5 |
| 4,660,787 A | * | 4/1987 | Sprenger et al. ......... 244/118.5 |
| 4,775,045 A | * | 10/1988 | Kuehl .................... 198/799 |

(Continued)

FOREIGN PATENT DOCUMENTS

DE 42 08 438 9/1993

(Continued)

*Primary Examiner*—Joe Dillon, Jr.
(74) *Attorney, Agent, or Firm*—W. F. Fasse; W. G. Fasse

(57) ABSTRACT

In a vertical conveyor arrangement for the transport of catering service goods in an aircraft with at least two decks arranged one above another, catering service goods are transported from a lower deck embodied as a freight deck into an upper deck. A conveyor arrangement is embodied according to the invention as a lift carriage, whereby the lift carriage is made up of a top structure with guide elements that are operatively connected with guide rails arranged above the freight deck, and a bottom structure that protrudes into the freight compartment in transport position, and that, for receiving a receptacle, comprises at least one cantilever arm reaching over the top side of the receptacle, a column element, side arms at least partially encompassing the sides of the receptacle, as well as a floor plate. The bottom structure forms a secured receiver for the receptacle.

Figure 1:
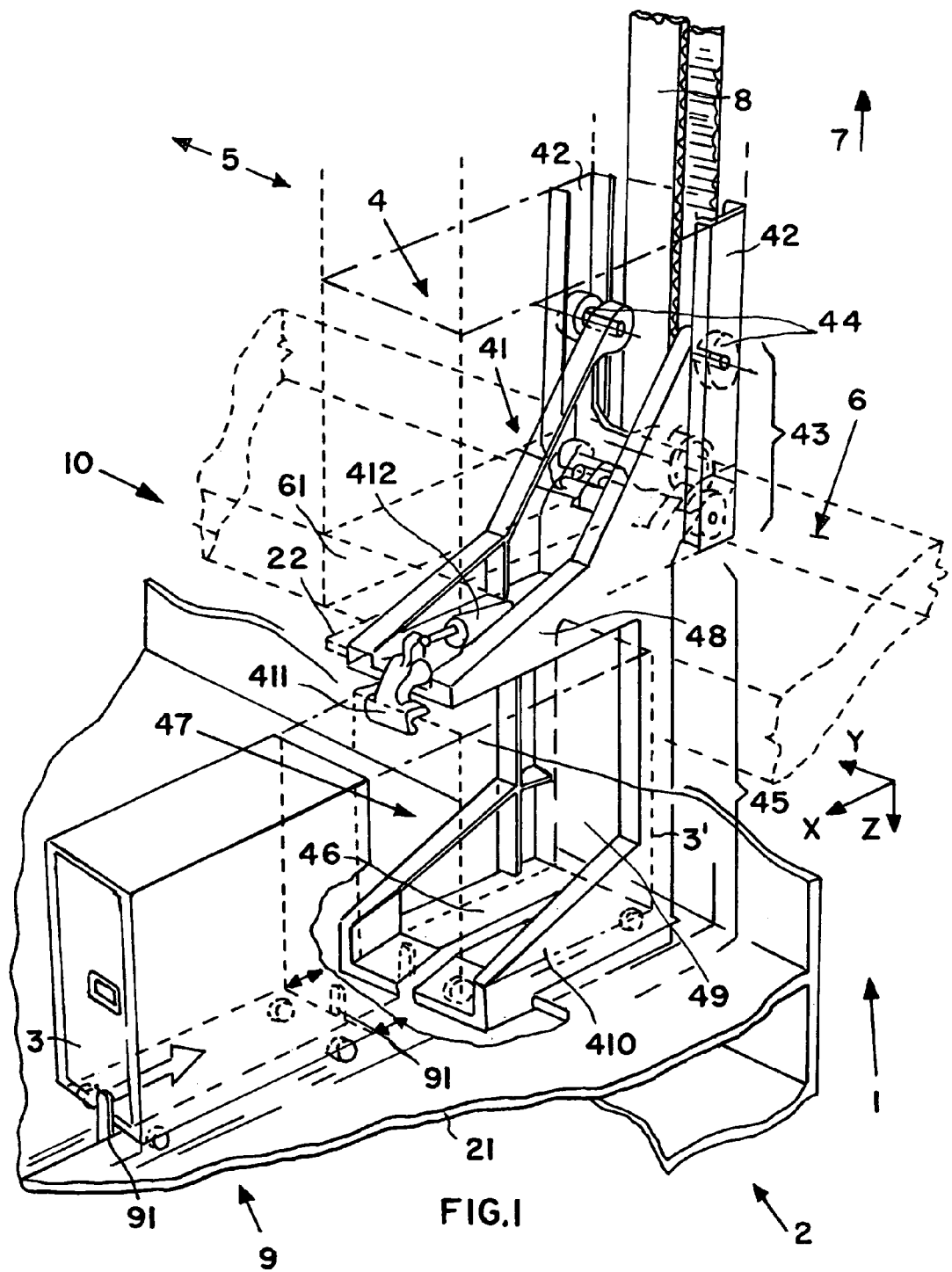

It is especially advantageous, through avoidance of a fixed lift installation in the freight compartment, not to hinder the throughgoing passability of the freight compartment in the loading with containers. Moreover, a reliable and continuous secure fixing of the transport receptacle is ensured during the lift operation.

11 Claims, 3 Drawing Sheets

U.S. PATENT DOCUMENTS

| | | | |
|---|---|---|---|
| 5,074,496 A | * 12/1991 | Rezag et al. | 244/118.1 |
| 5,163,726 A | 11/1992 | Boos et al. | |
| 5,205,515 A | * 4/1993 | Luria | 244/118.5 |
| 5,322,244 A | * 6/1994 | Dallmann et al. | 244/118.5 |
| 6,152,287 A | 11/2000 | Luria | |
| 6,454,208 B1 | * 9/2002 | Nervig et al. | 244/118.1 |
| 6,663,043 B1 | * 12/2003 | Luria | 244/118.1 |
| 6,971,608 B1 | * 12/2005 | Harrington et al. | 244/118.5 |
| 2001/0045326 A1 | 11/2001 | Gottlieb et al. | |
| 2004/0188564 A1 | 9/2004 | Boe et al. | |

FOREIGN PATENT DOCUMENTS

| | | |
|---|---|---|
| DE | 199 55 801 | 6/2000 |
| DE | 199 00 256 | 7/2000 |
| DE | 102 04 892 | 8/2003 |

* cited by examiner

VERTICAL CONVEYOR ARRANGEMENT FOR THE TRANSPORT OF CATERING SERVICE GOODS IN AN AIRCRAFT WITH AT LEAST TWO DECKS ARRANGED ONE ABOVE ANOTHER

The invention relates to a vertical conveyor arrangement for the transport of catering service goods in an aircraft with at least two decks arranged one above another, whereby catering service goods are to be transported from a lower deck embodied as a freight or cargo deck into an upper deck, essentially consisting of a conveyor arrangement that cooperates with guide rails arranged above the freight deck.

A method for the vertical transport of catering service goods is set forth in the DE 199 00 256 C2, whereby the catering receptacle (e.g. trolley) that is to be conveyed is introduced into a special conveyor basket, which brings the transport goods from a lower deck to an upper deck. A lift arrangement is installed in the lower deck embodied as a freight deck. A quite complex arrangement for the adjustment of the lift arrangement is necessary in order to compensate or even-out deformations of the structure on the part of the aircraft during flight, and thereby to avoid a tilting and jamming of the conveyor basket in the conveyor shaft, when the basket is moved from deck to deck. The entire arrangement of a rigid or fixed installation in the aircraft requires space, which then no longer remains available for transport capacity in the freight deck. Moreover, with a fixed rigid installation, the throughgoing passability for containers in the freight compartment is no longer provided, which would significantly limit the layout flexibility of the aircraft.

In the U.S. Pat. No. 6,152,287, a system of a lift spindle, conveyor cages, and trolleys is specified for the vertical transport of catering service receptacles. Special anchor elements, which securely hold the cage rolls, serve for the fixing of the cage in the lift. In the document it can be seen that the entire lift or hoist requires vertical rails in the freight compartment and on the passenger deck. Also here, installations for the lift arrangement are necessary in the freight deck, and these installations make demands on the space and hinder the throughgoing passability of the freight compartment.

Among other things, a vertical conveyor arrangement for catering containers is illustrated in FIG. 10 of U.S. Pat. No. 5,322,244. There is provided a telescope lift, which, beginning from a stationary section in the main deck, can lower movable telescope sections into the freight compartment, which grasp the container by means of graspers or grippers, and transport it into the kitchen or galley in the main deck. Nothing is disclosed, however, about a securing of the container in a lift operation during the flight, and due to arising wind gusts or accelerations in the aircraft, the containers, which are quite heavy in the loaded condition, can get out of the transport position, and a reliable operation of the telescope lift is not ensured.

The DE 199 55 801 A1 shows a vertical conveyor arrangement, whereby a transport basket is vertically drivably or movably arranged on a mast. In an embodiment it can be seen that a plane, onto which the transport basket can be lowered, is provided even under or below the bottom mast mounting or securement. For this lifting and lowering function, lift scissors are provided as a second conveyor arrangement—independently of the conveying on the mast—, wherein these lift scissors laterally grasp or grip on the transport basket, and lift and simultaneously guide the transport basket through movement of the scissors. With this conveyor arrangement it is, for example, provided, to carry out a loading or unloading of catering service goods through a flap of an aircraft vertically downwardly. This additional transport possibility, however, comprises no transport securing arrangement, as is, however, indispensable in the operating of the conveyor arrangement during the flight.

Thus, summarizing, for the above described known solutions of the vertical transport of catering service goods it can be determined that it mostly involves the principle of vertically transporting receptacles (e.g. trolleys) by means of lift arrangements that make installations in the freight compartment necessary. Therewith, however, the throughgoing passability of the freight compartment for a good flexibility in the loading with freight containers cannot be ensured, since then the freight compartment cross-section is blocked by the lift installation.

An alternative solution is shown by a telescope lift arrangement that is arranged in the main deck, and movable telescope parts grasp into a freight container arranged therebelow. With a lowered telescope part, which comprises grasping or gripping means for a container, the transport of a container from the freight deck arranged below the main deck is realized. For the utilization in the flight operation, this is, however, not directly or simply possible due to the self-movement of the aircraft, because a continuous securing of the transport goods against uncontrolled movements and oscillations is unavoidably necessary for such a construction concept, and such securing elements are not provided in this solution.

According to the aspects mentioned in the above, it is now an object of the invention to embody a vertical conveyor arrangement that does not hinder the throughgoing passability of the freight compartment in the loading with freight and catering containers by avoiding a fixed or rigid lift installation in the freight compartment, and also ensures a reliable and continuous secure fixing of the transport receptacle during the lift operation.

This object is achieved according to the invention through the measures identified in the patent claim 1.

In that regard according to claim 1, it is especially advantageous that a securing of the transport receptacle in the vertical conveying also takes place during a flight of the commercial transport aircraft, and simultaneously an assurance of the throughgoing passability of the freight compartment in the loading with freight and catering containers is given, that is to say no fixed or rigid lift installation in the freight compartment is necessary. As further advantages, there arise possibilities of the direct lift access to standard receptacles without additional movable transport cages. An additional pushing-in or insertion process of a catering receptacle into a transport cage can be avoided, which contributes to the minimization of the lift cycle time. A revision or alteration, or a structural supplementation (brackets or fittings) of standard receptacles (e.g. trolleys) can be avoided, which improves the application or utilization possibilities of the vertical conveyor arrangement according to the invention. Due to the stationary installation in only one deck, the conveyor arrangement is relatively insensitive with respect to arising deformations of the aircraft cell or airframe during the flight.

Further developments and advantageous embodiments are specified in the claims 2 to 11.

Further details and advantages arise from the following description of an example embodiment of the invention.

Figure 2:
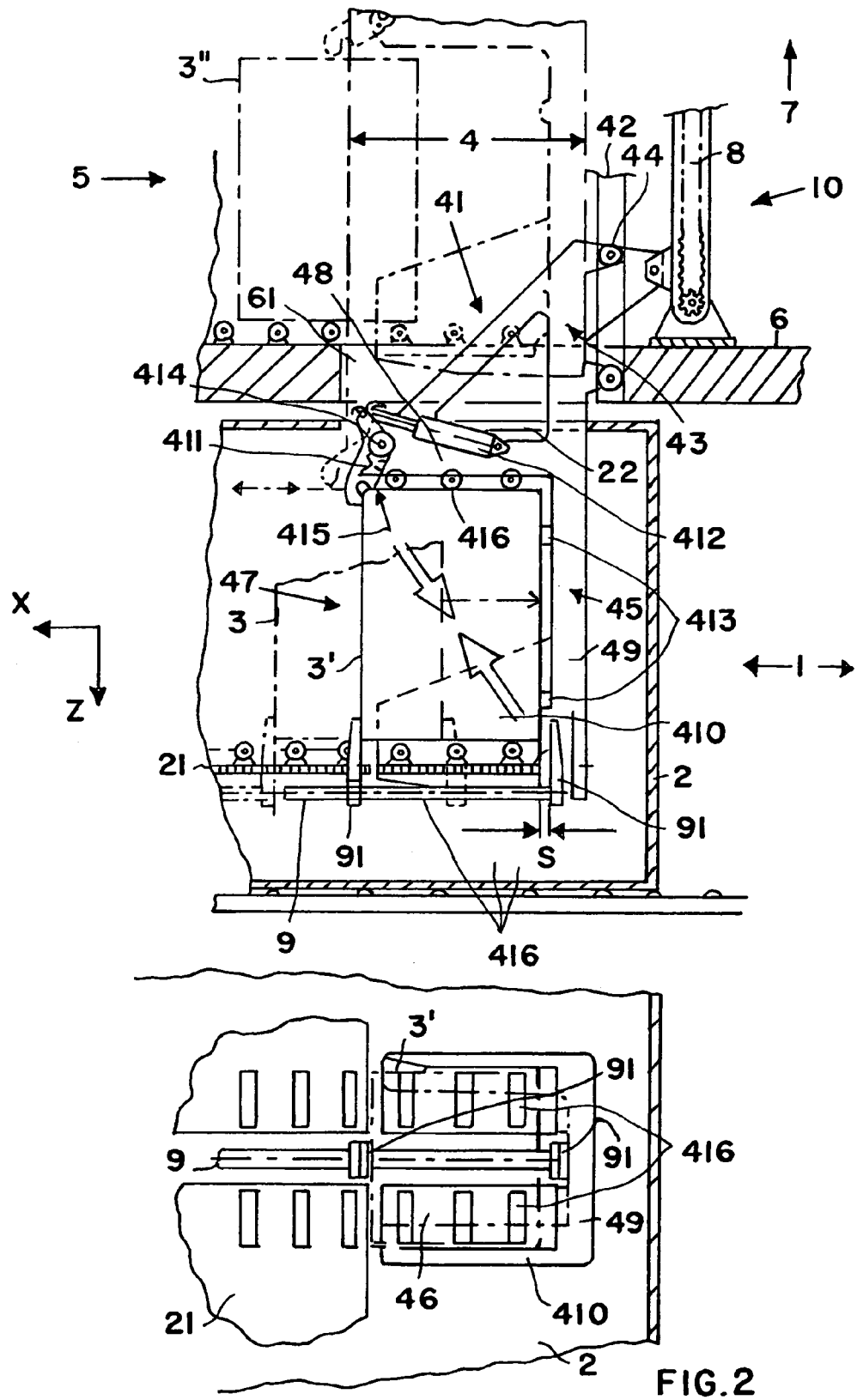
Figure 3:
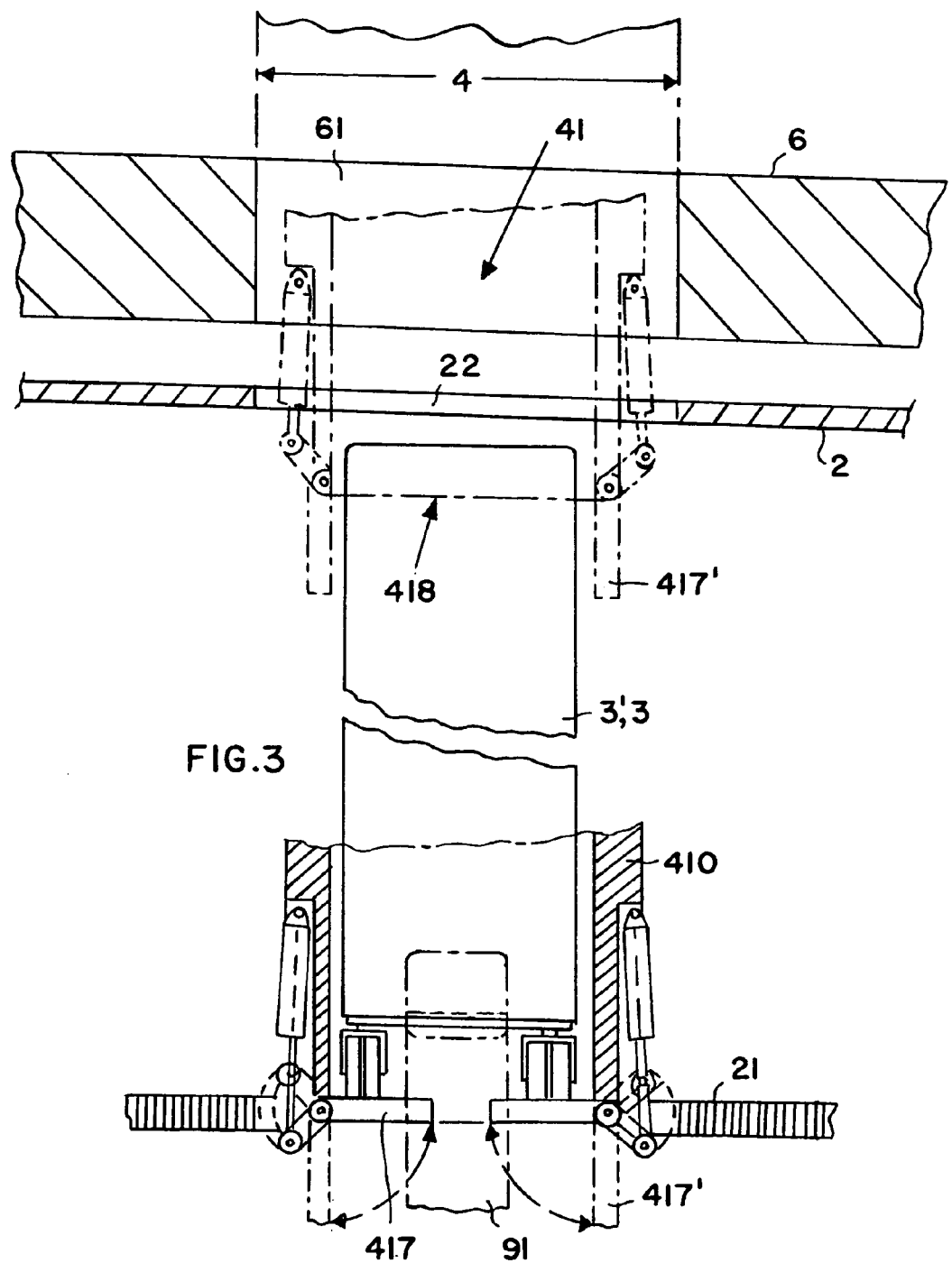

In the following, the invention is explained on the basis of an example embodiment, and is graphically illustrated in the FIGS. 1 to 3. It is shown by:

FIG. 1 a perspective illustration of a vertical conveyor arrangement;

FIG. 2. a sectional illustration of the lift according to claim 1 in elevation and in plan; and FIG. 3 floor flaps in the function as carrier platform.

In a perspective illustration, the FIG. 1 gives an overview over a vertical conveyor arrangement 10 for the transport of catering service goods in an aircraft with at least two decks arranged one above another. In the following, the vertical conveyor arrangement 10 is also called a hoist or lift equipment. The below-deck cargo or freight compartment 1 is located below the main deck 6 and serves to receive freight or cargo containers as well as catering service containers 2. A catering service container 2 is, for example, constructed as is known from document DE 199 00 256, and can receive or contain plural catering receptacles 3. The containers 2 are introduced from outside through a freight door or gate into the freight compartment 1 and are there slidingly shifted in the longitudinal direction (x-direction) whereby the catering container 2 is preferably positioned below the galley 5. The catering container 2 contains or receives catering service goods in the form of special receptacles 3, such as e.g. standard trolleys or boxes, which are supported on the container intermediate floor 21 and are moved by a horizontal conveyor system 9, e.g. with gripping or grasping claws 91, individually into transport position 3'. The boundary of the hoist or lift shaft 4 continues downwardly through a container ceiling opening 22.

The lift equipment 10 consists of the main components lift or hoist carriage 41—consisting of a lift top structure 43 and a lift bottom structure 45—, guide rails 42, and drive for example by means of toothed gear belt 8. Running rollers 44 that are located in the preferably U-shaped guide rails 42 are secured on the lift top structure 43 in the region of the main deck. The lift bottom structure 45 is lowered from above through the opening 61 in the main deck 6 and the container ceiling opening 22 down to the container intermediate floor 21. Thereby it is ensured that the below deck freight compartment 1, without fixed installations, remains throughgoing passable for the unhindered sliding shifting of the containers 2. Moreover, through this lift concept, possibly arising deformations on the part of the aircraft are taken up, because the lift floor plate 46, which is somewhat conical at the front, directly and easily tolerates a tilted position of several degrees of the receptacles 3 as well as a certain vertical offset relative to the floor 21 during the pushing-in of the receptacles 3. The lift bottom structure 45 has a front opening 47 through which the receptacle 3 comes onto the floor plate 46. Further components of the bottom structure 45 are: cantilever arm 48, rear or back wall 49, side arms 410, and a holding flap 411. Therewith the bottom structure 45 forms a C-shaped receiver for the receptacle 3, which is taken up or received on the end face. The rear wall 49 is a component of a column element, which is simultaneously the boundary and the contact-stop for the end surface of the receptacle 3 to be moved or driven in. By means of this arrangement it is made possible, that the receptacle 3 is pushed into the bottom structure 45, for example by means of grasping claws 91, and there can be securely fixed by the holding flap 411. As needed in that regard, the floor plate 46 is embodied slotted for the passing of the grasping claw 91. If the receptacle 3 has reached its transport position 3', the holding flap 411 tilts inwardly onto the receptacle by means of actuating cylinder 412, and thus forms a form-locking and force-locking connection. An activation of the actuating cylinder 412 can occur by proximity sensors or proximity switches (not shown). Thereby, the receptacle 3 is secured for the vertical transport to the main deck 6 and upper deck 7. This embodiment of a lift carriage 41 manages to operate without additional brackets or fittings on the receptacle 3 for the taking-up or receiving of the receptacle.

FIG. 2 shows the lift equipment 10 in section in elevation and plan. As an example, a receptacle 3 without its own running rollers is illustrated here, wherein the receptacle is pushed and shifted by means of grasping claws 91, on a roller track mounted on the floor 21, into the lift bottom structure 45 and transport position 3'. This is reached when the receptacle 3 contacts against the pressure pads or cushions 413, which are arranged on the rear wall 49. Next, the holding flap 411 arranged on the upper rim edge of the opening 47 comes into function and ensures a secure fixing of the cargo, whereby the rotation axis 414 lies perpendicularly to the receptacle push-in direction (this is the x-direction in the example). With this axis arrangement it is possible to exert the holding force indicated by arrows. As the drawing shows, the loading process is facilitated by roller tracks 416 mounted on the floor plate 46. As required, these may additionally be mounted also on the side arms 410 or on the cantilever arm 48. After the fixing of the receptacle 3' by the holding flap 411 is completed, the grasping claws 91 (in the case of a guided movement) release themselves from the receptacle, and the vertical movement can begin. An existing play S facilitates this process. Depending on the embodiment or construction of the horizontal conveyor system 9, the floor plate 46 comprises a slit or slot for the moving of the grasping claw 91. The triggering of the flap motion 411 by the actuating cylinder 412 suitably occurs via a proximity sensor (not shown), when the receptacle has reached the transport position 3'. During the unloading process 3", the deactivation of the actuating cylinder 412 can be carried out manually or similarly by means of a sensor.

In FIG. 3, a variant of the lift according to the invention is illustrated, in which the cargo 3 can be directly reached or grasped by the lift carriage 41 coming from above. In this case, the receptacle 3 is already located in the transport position 3' below the lift shaft 4, when the lift is lowered downwardly from above. This functional sequence has the advantage, that the horizontal conveyor system 9 can prepare or ready the receptacle 3 simultaneously with the lift vertical motion—the pushing-in process is omitted—, whereby the cycle times can be shortened. This method is made possible according to the invention by controllable floor flaps 417, of which the motion is achieved by means of servo-cylinders or control levers. The cycle progression or sequence takes place in such a manner that first the grasping claws 91 bring the receptacle 3 into the transport position 3' and hold it there. Then the lift carriage 41 coming from above moves or drives with tilted-out floor flaps 417' over the receptacle 3'. Upon reaching the lowermost lift position, the flaps 417 tilt or pivot inwardly and thus form a carrier platform for the cargo. Next, this is fixed by means of the above described holding flap 411, and the grasping claws 91 release it. After the lift carriage 41 has reached the selected or called-up deck (main deck 6 or upper deck 7), the receptacle 3 can be unloaded, whereby the floor flaps 417 are located at the height of the respective deck plane. In the case that now empty cargo is conveyed downwardly, the flaps remain in the position as carrier platform. In the other case, when the next receptacle 3 is to be retrieved out of the catering container, the flaps move themselves into the tilted-out position 417', while the lift carriage 41 moves or drives downwardly.

The invention claimed is:

1. Vertical conveyor arrangement for the transport of catering service goods in an aircraft with at least two decks arranged one above another, whereby catering service goods are to be transported from a lower deck embodied as a freight deck into an upper deck, essentially consisting of a conveyor arrangement that cooperates with guide rails arranged above the freight deck, characterized in that the conveyor arrangement is embodied as lift carriage (41), the lift carriage (41) is made up of a top structure (43) with guide elements (44), which are operatively connected with the guide rails (42), and a bottom structure (45) that protrudes into the freight deck in a transport position, and that, for the receiving of a receptacle (3), comprises at least one cantilever arm (48) reaching over the top side of the receptacle, a column element (49), side arms (410) at least partially encompassing the sides of the receptacle (3), as well as a floor plate (46), whereby the bottom structure (45) forms a secured receiver (47) for the receptacle (3).

2. Vertical conveyor arrangement according to claim 1, characterized in that the bottom structure (45) of the lift carriage (41) forms a C-shaped receiver (47) for the receptacle (3), into which the receptacle (3) can be moved, and the receptacle (3) is latchable by means of a holding flap (411) provided on the upper rim edge of the receiver (47).

3. Vertical conveyor arrangement according to claim 1, characterized in that running rollers (44) are provided as guide elements, which run in U-shaped guide rails (42).

4. Vertical conveyor arrangement according to claim 1, characterized in that the column element (49) comprises a rear wall that includes contact elements (413) as a contact stop for the receptacle (3).

5. Vertical conveyor arrangement according to claim 1, characterized in that the floor plate (46) is embodied slotted for the possible movement of grasping claws (91) of a horizontal conveyor system (9).

6. Vertical conveyor arrangement according to claim 1, characterized in that the floor plate (46) is provided with drive-in slopes.

7. Vertical conveyor arrangement according claim 2, characterized in that in the area of the cantilever arm (48), a rotation axis (414) is arranged transversely to the receptacle push-in direction for the holding flap (411), the holding flap (411) takes up a latched condition by rotation about the rotation axis (414) after a pushing-in of the receptacle (3), whereby the receptacle (3) is secured in the push-in direction during the lift transport.

8. Vertical conveyor arrangement according to claim 2, characterized in that the holding flap (411) comes into function through an activatable actuating cylinder (412) before starting operation of the lift and only then when the receptacle (3) has reached its transport position (3') in the bottom structure (45), and that the deactivation of the actuating cylinder (412) in the unloading process (3") can be carried out manually or by means of a sensor.

9. Vertical conveyor arrangement according to claim 1, characterized in that at least partially the inner surfaces of the bottom structure (45) comprise roller elements (416) for the stabilization and guidance of the receptacle (3).

10. Vertical conveyor arrangement according to claim 1, characterized in that a bottom opening (418) closeable with floor flaps (417) is provided instead of the floor plate (46).

11. Vertical conveyor arrangement according to claim 10, characterized in that respectively one floor flap (417) is arranged respectively on one side arm (410) and the floor flaps (417) are controllable by servo-cylinders or control levers at the individual lift stations from the tilted-in into the tilted-out condition (417'), whereby the flaps (417) as needed form a carrier platform or a receiver opening (418) for the receptacle (3'), (3").

* * * * *